United States Patent Office 3,413,169
Patented Nov. 26, 1968

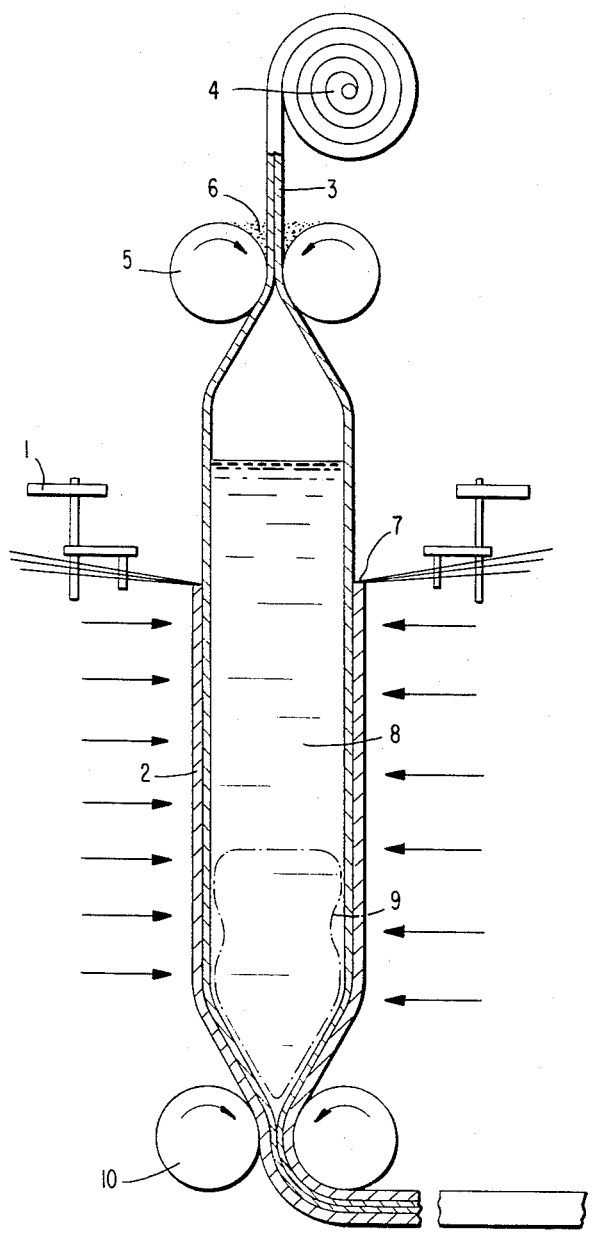

3,413,169
METHOD OF MAKING A HOSE COMBINATION OF A PLASTIC LINER AND A FIBROUS SHEATH
Adam Krings, Troisdorf, and Bernhard Kraemer, Oberlar, Germany, assignors to Dynamit Nobel Aktiengesellschaft, Troisdorf, Germany
Filed Aug. 13, 1964, Ser. No. 389,326
11 Claims. (Cl. 156—149)

ABSTRACT OF THE DISCLOSURE

The present disclosure relates to a hose combination comprising a hose jacket or sheath prepared from natural or synthetic fibers and an inner lining made from a synthetic material. The present disclosure also relates to a continuous process for the preparation of a hose combination wherein an inner lining is introduced into a fibrous outer sheath and combined into a concentric unit by conveying said combination through a zone of heat and pressure.

---

The present invention relates to a hose combination made of a hose jacket or sheath prepared from natural or synthetic fibers by weaving, knitting or braiding, and an inner lining made from synthetic material.

Such hose combinations have already been known in various forms. One of the prior art structures is, for example, a hose combination wherein the hose jacket or sheath woven from fully synthetic plastic fibers is coated or covered internally with a plastic. This hose is made by repeatedly filling into the vertically suspended hose a plastic diluted with a solvent. Apart from the fact that this process is relatively costly, it also has the disadvantage that a faultless uniform coating of the entire inner surface of the hose cannot be assured with absolute certainty.

The prior art process described hereinabove may be employed, moreover, only with hoses having relatively short lengths. Thus, it has been previously proposed to pull or press through the hose a spherically or streamline-shaped perforated body filled with a plastic solution or dispersion so that the plastic solution is given off to the inner wall of the hose through the openings in the body and the latter is thereby coated therewith. A further previous solution to the problem provided that a certain amount of plastic material be poured into the hose and this material then spread onto the inner wall of the hose by pulling therethrough a nonperforated rotating body. While this process makes it possible to provide hose pieces of somewhat longer length, satisfactory hose lengths may nevertheless not be obtained therewith, nor is a uniform application of the plastic inner coating over the entire inner surface of the sheath or jacket assured.

According to another known process, a hose combination made from a hose sheath or jacket of natural or synthetic fibers and an inner lining or coating of plastic material can be made by lining the finished hose sheath with a foil made from linear synthetic polymers, such as polyesters, polyamides, or polyolefins. In this case, it is suggested that the hose and the contacting ends thereof be first prepared from a foil strip and this then introduced into the finished hose sheath, whereby it is glued thereto by means of an adhesive material and, if desired, with the use of pressure and heat. However, this process is characterized by the essential disadvantage that only hoses having relatively short lengths can be prepared. Moreover, a uniformly thick inner lining is not assured a priori, due to the use of the foil strip.

One of the objects of the present invention is to provide a hose combination and a process for preparing the same which overcomes the disadvantages and deficiencies of the prior art.

Another object of the present invention is to provide an improved hose combination and an improved process for making it which may be carried out effectively and economically.

A further object of the present invention is to provide a hose combination that has an inner lining or coating of uniform thickness and which is faultlessly impervious to fluids.

A still further object of the present invention is to provide a process for making an improved hose combination in advantageously long or even unlimited lengths which maintains a uniformly thick and impervious coating throughout its length.

These and other objects of the present invention will become apparent to those skilled in the art from a reading of the following specification and claims.

In accordance with the present invention, a hose combination consisting of a hose sheath made from natural or synthetic fibers by weaving, knitting or braiding and an inner lining made from plastic material is provided in which the inner lining is prepared from an extruded hose of a thermoplastic material, preferably from polyurethanes or polyamides, and is connected or combined with the sheath by the application of heat and pressure. Although polyurethane or polyamide plastics have been mentioned as the preferred materials for use in making the inner lining or hose, any thermoplastic material may be utilized. The terms polyurethane and polyamide plastics are used herein as generally understood and accepted in the art, i.e., polyurethanes are the polymers resulting from the reaction of diisocyanates with organic compounds containing two or more active hydrogens (e.g., alcohols, phenols, amines, and other hydroxylic and carboxylic compounds) and polyamides are the polymers that result from the polymerization of amino acids or by the condensation of polyamines with polycarboxylic acids.

Because of the prefabricated and seamless inner lining, the hose combination of the present invention has the advantage, over all the heretofore known hose combinations, that it possesses a uniformly thick inner lining or coating as well as a complete imperviousness to fluids. Additionally, however, the hose combination proposed by the present invention also makes it possible to manufacture such combinations in very large or even unlimited lengths if, according to a further proposal by the present invention, the manufacture or preparation of the hose sheath or jacket is made in a continuous operation. A continuous operation can be effectively carried out by continuously introducing the plastic inner lining into the hose sheath or jacket, the hose portions thus being telescopically positioned with respect to each other, while moving along at the same speed. The two portions of the hose are then continuously combined or connected with each other, while passing through a connection or combining zone provided behind the area used for fabricating or manufacturing the jacket or sheath. Such a connection or combining of the two hose portions is carried out by the use of heat from the outside and the simultaneous exertion of a pressing power or pressure from within. In carrying out this continuous manufacturing operation, the plastic inner lining may be provided on a storage or delivery spool or the like in very long lengths and continuously drawn off the spool as required for introducing it into the hose sheath. Alternatively, the arrangement may be made in such a manner that the plastic hose is continuously fed into the hose sheath immediately upon issuing from an extruder nozzle, whereby, in the latter case, an endless hose may be prepared. The prerequisite for this latter arrangement is, of course, that the plastic hose be extruded at the same working speed as the continuous preparation or manufacture of the hose sheath is conducted.

The invention will now be explained in further detail on the basis of the attached drawing which schematically illustrates one embodiment of an apparatus for the preparation of a hose combination in accordance with the present invention.

Reference numeral 1 designates a loom on which the hose sheath or jacket 2 is woven from natural or synthetic fibers in a continuous operation. At the same speed at which the manufacture of the hose sheath is carried out, the extruded plastic hose or inner lining 3 is introduced thereinto from above so that the telescopically positioned parts of the hose sheath 2 and of the plastic hose or inner lining 3 move along at the same speed. The plastic hose 3 is thereby continuously drawn off the storage or delivery spool 4 in the required manner, the spool containing a plastic hose 3 of a relatively long length. Prior to entering into the hose sheath 2, the plastic hose 3 passes between the oppositely directed pair of rollers 5 at which time the adhesive agent 6 is brushed and coated on its entire outer surface, adhesive agent 6 being continuously applied onto the rollers in a sufficient amount and in the manner shown. The adhesive agent may be any of those well known in the art which will provide a good bond between the particular materials used in the sheath and in the lining. Below the finishing or production point 7 of the hose sheath 2, heat is applied from the outside to the telescopically positioned hose parts, as indicated by the arrows, while a pressing power or pressure is simultaneously exerted from within. The exertion of the pressure may be effected by means of a fluid, designated by 8 on the drawing. Pressure may also be exerted, for example, by means of a molded body, shown on the drawing as 9. Below the zone in which the firm and permanent combination or connection of the two hose parts with each other is effected, the combined hose is again passed between an oppositely directed pair of rollers 10. On the one hand, this pair of rollers 10 has the dual function of preventing any running out of the hose and of preventing an undesired further traveling of the fluid 8 or of the molded body 9. On the other hand, the two hose parts are once again firmly pressed together by this pair of rollers 10 so that the best assurance is given for a good combination or connection between the hose sheath or jacket 2 and the lining 3. The rotational speed of the rollers of both pairs of rollers 5 and 10 is, of course, exactly coordinated to the working speed of the loom 1. The drawing off of the plastic hose or lining 3 from the storage or delivery spool 4 may be made selectively by one of the two pairs of rollers 5 or 10, but it is more expedient to do this by means of the pair of rollers 10.

Instead of providing the plastic hose 3 on a storage or delivery spool 4 in a predetermined length and drawing it off the same, the plastic hose may be introduced into the hose sheath or jacket 2 directly upon leaving an extruder, whereby a hose having an endless length may be practically prepared. The prerequisite for this operation, as noted above, is that the plastic hose or lining 3 must be extruded at precisely the same working speed as the manufacture of the hose sheath or jacket 2 takes place on the loom. Additionally, it is advisable to provide, in this case, a cooling zone between the extruder and the place where the plastic hose or inner lining 3 enters into the hose sheath or jacket 2. Otherwise, exactly the same arrangement may be made and the same working procedure employed as described hereinabove.

Adhesives that may be utilized herein include, for example, adhesives, based on synthetic rubbers, for example adhesives of neoprene like Terokal, Bostik A 4, Patex or the like, adhesives such as of polyvinyl ether in organic solvents, for example Lutonal in the cyclohexanone, acetone, adhesives, such as polyurethanes in tetrahydrofurane or dimethylformamid. The heat and pressures to be used in the process vary according to the circumstances, as known to those skilled in the art. Examples of operative conditions to be employed are, for example, heating temperatures of 80 to 180° C., along with pressures of from 1.5 to 3 atmospheres on the interior surface of the inner lining.

The invention being thus described, it will be obvious that the same may be varied in many ways. Such variations are not to be regarded as a departure from the spirit and scope of the invention and all such modifications are intended to be included within the scope of the following claims.

We claim:
1. A continuous process for the preparation of a hose combination which comprises continuously applying an adhesive to the outer surface of a flexible inner lining made of a thermoplastic material, continuously introducing said inner lining into a fibrous outer sheath as said sheath is being continuously formed, combining said outer sheath and said inner lining into a concentric tubular unit by conveying said unit through a zone where said unit is simultaneously heated from the outside and exposed to pressure on the inside, and subsequently pressing together the opposed surfaces of said tubular unit, to join the elements of said unit together.

2. A process in accordance with claim 1, wherein the thermoplastic inner lining is a polyurethane plastic.

3. A process in accordance with claim 1, wherein the thermoplastic inner lining is a polyamide plastic.

4. A process in accordance with claim 1, wherein said inner lining is continuously introduced into said outer sheath by continuously drawing it off a delivery spool.

5. A process in accordance with claim 1, wherein said pressure is exerted by means of a fluid inside said inner lining.

6. A process in accordance with claim 1, wherein said pressure is exerted by means of a molded body inside said inner lining.

7. Process in accordance with claim 1, wherein said adhesive is a solution of a thermoplastic material.

8. Process in accordance with claim 7, wherein said thermoplastic material is a polyurethane plastic.

9. Process in accordance with claim 7, wherein said thermoplastic material is a polyamide plastic.

10. The process in accordance with claim 9, wherein the inner lining drawn from the extruder is passed through a cooling zone before it is introduced into said outer sheath.

11. The process in accordance with claim 1, wherein said unit is heated on the outside at a temperature of about 80° to 180° C. and exposed to a pressure of about 1.5 to 3 atmospheres on the interior surface of said inner lining.

References Cited

UNITED STATES PATENTS

| | | | |
|---|---|---|---|
| 3,049,762 | 8/1962 | Jackson | 156—149 |
| 3,184,358 | 5/1965 | Utz | 156—244 |
| 2,502,638 | 4/1950 | Becht | 156—244 X |
| 3,118,800 | 1/1964 | Snelling | 156—244 X |
| 2,512,433 | 6/1950 | Leben | 156—149 X |
| 2,262,514 | 11/1941 | Pape | 156—149 |
| 513,799 | 1/1894 | Lombard | 156—149 |
| 3,289,703 | 12/1966 | Brown | 156—144 X |
| 2,977,839 | 4/1961 | Koch | 156—149 X |
| 2,093,206 | 9/1937 | Muller | 156—172 X |

PHILIP DIER, *Primary Examiner.*

EARL M. BERGERT, *Assistant Examiner.*